(12) United States Patent
Miura

(10) Patent No.: US 11,903,050 B2
(45) Date of Patent: Feb. 13, 2024

(54) COMMUNICATION DEVICE AND CONTROL METHOD THEREOF

(71) Applicant: KYOCERA CORPORATION, Kyoto (JP)

(72) Inventor: Hiroaki Miura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/933,464

(22) Filed: Sep. 19, 2022

(65) Prior Publication Data

US 2023/0013668 A1 Jan. 19, 2023

Related U.S. Application Data

(63) Continuation of application No. 16/857,114, filed on Apr. 23, 2020, now Pat. No. 11,490,431.

(30) Foreign Application Priority Data

Apr. 24, 2019 (JP) .................................. 2019-082738

(51) Int. Cl.
| | |
|---|---|
| H04W 76/11 | (2018.01) |
| H04L 5/00 | (2006.01) |
| H04B 1/38 | (2015.01) |
| H04W 88/12 | (2009.01) |
| H04W 84/12 | (2009.01) |

(52) U.S. Cl.
CPC .............. *H04W 76/11* (2018.02); *H04B 1/38* (2013.01); *H04L 5/0055* (2013.01); *H04W 88/12* (2013.01); *H04W 84/12* (2013.01)

(58) Field of Classification Search
CPC ..... H04W 84/12; H04W 48/20; H04W 36/14; H04W 76/10; H04W 88/12; H04W 76/11; H04L 12/2856; H04L 43/0811; H04L 5/0055; H04M 1/72445; H04B 1/38
See application file for complete search history.

(56) References Cited

U.S. PATENT DOCUMENTS

| | | | |
|---|---|---|---|
| 9,907,108 B2 | 2/2018 | Kunieda et al. | |
| 2008/0057936 A1* | 3/2008 | Oosawa | H04W 8/005 455/556.1 |
| 2012/0176929 A1* | 7/2012 | Choi | H04W 76/34 370/332 |
| 2013/0051299 A1* | 2/2013 | Hua | G06Q 30/0241 370/312 |
| 2014/0200034 A1 | 7/2014 | Lee et al. | |
| 2014/0244839 A1 | 8/2014 | Yoon et al. | |
| 2014/0328187 A1 | 11/2014 | Rantanen et al. | |
| 2020/0213910 A1 | 7/2020 | Brown et al. | |

FOREIGN PATENT DOCUMENTS

JP 201584515 A 4/2015

* cited by examiner

*Primary Examiner* — Quoc Thai N Vu
(74) *Attorney, Agent, or Firm* — HAUPTMAN HAM, LLP

(57) ABSTRACT

A communication equipment comprises a wireless LAN transceiver, and a controller. The controller is configured to when performing connect process to an access point by the wireless LAN transceiver, decide whether to perform a communication acknowledgement to confirm availability of an internet connection via the access point, on the basis of identification information which the wireless LAN transceiver receives from the access point.

16 Claims, 3 Drawing Sheets

| AP | SSID | MAC ADDRESS | IP ADDRESS | DEVICE TYPE |
|----|------|-------------|------------|-------------|
| #1 | ... | ... | ... | ... |
| #2 | ... | ... | ... | ... |

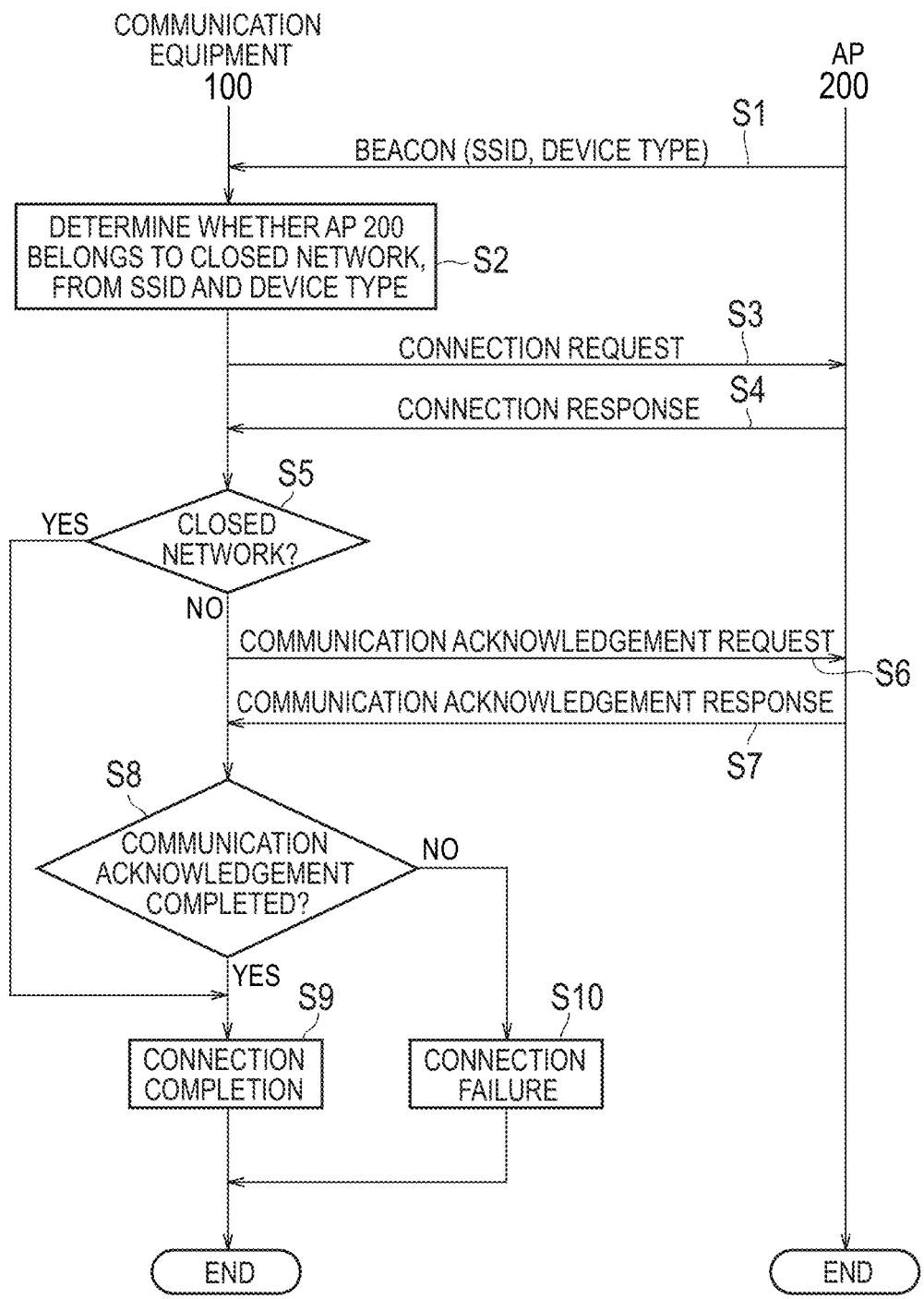

COMMUNICATION DEVICE AND CONTROL METHOD THEREOF

CROSS-REFERENCE TO RELATED APPLICATIONS

The present application is a continuation of U.S. patent application Ser. No. 16/857,114 filed on Apr. 23, 2020, which claims the benefit of priority from the prior Japanese Patent Application No. 2019-082738, filed on Apr. 24, 2019, the entire contents of which are incorporated herein by reference.

TECHNICAL FIELD

The present disclosure relates to a communication equipment and a control method thereof.

BACKGROUND

A communication equipment compatible with wireless LAN communication has a function for performing a communication acknowledgement when performing connect process to a wireless LAN access point. More specifically, a communication equipment performs a communication acknowledgement with respect to a predetermined server on the internet via an access point, and after confirming that an internet connection is can be used, completes the connect process to the access point. This function is sometimes called a captive portal.

In recent years, much focus has been placed on a use case where a communication equipment such as a smartphone makes an extension call by using wireless LAN communication. In such a use case, the access point which the communication equipment connects to may be a closed network that does not have an internet connection.

SUMMARY

A communication equipment according to a first aspect comprises a wireless LAN transceiver configured to perform a connect process to an access point, and a controller configured to perform, via the access point, a communication acknowledgement confirming availability of an internet connection. when the wireless LAN transceiver performs the connect process, the controller is further configured to perform, the communication acknowledgement when the access point does not belong to a closed network, and not perform the communication acknowledgement when the access point belongs to the closed network.

A method for controlling a communication equipment comprising a wireless LAN transceiver configured to perform a connect process to an access point according to a second aspect comprises performing, via the access point, a communication acknowledgement confirming availability of an internet connection, performing the communication acknowledgement when the access point does not belong to a closed network when the wireless LAN transceiver performs the connect process, and not performing the communication acknowledgement when the access point belongs to the closed network when the wireless LAN transceiver performs the connect process.

BRIEF DESCRIPTION OF DRAWINGS

FIG. 4 is a diagram illustrating the functioning of the communication equipment according to the first embodiment.

DETAILED DESCRIPTION

Figure 1:
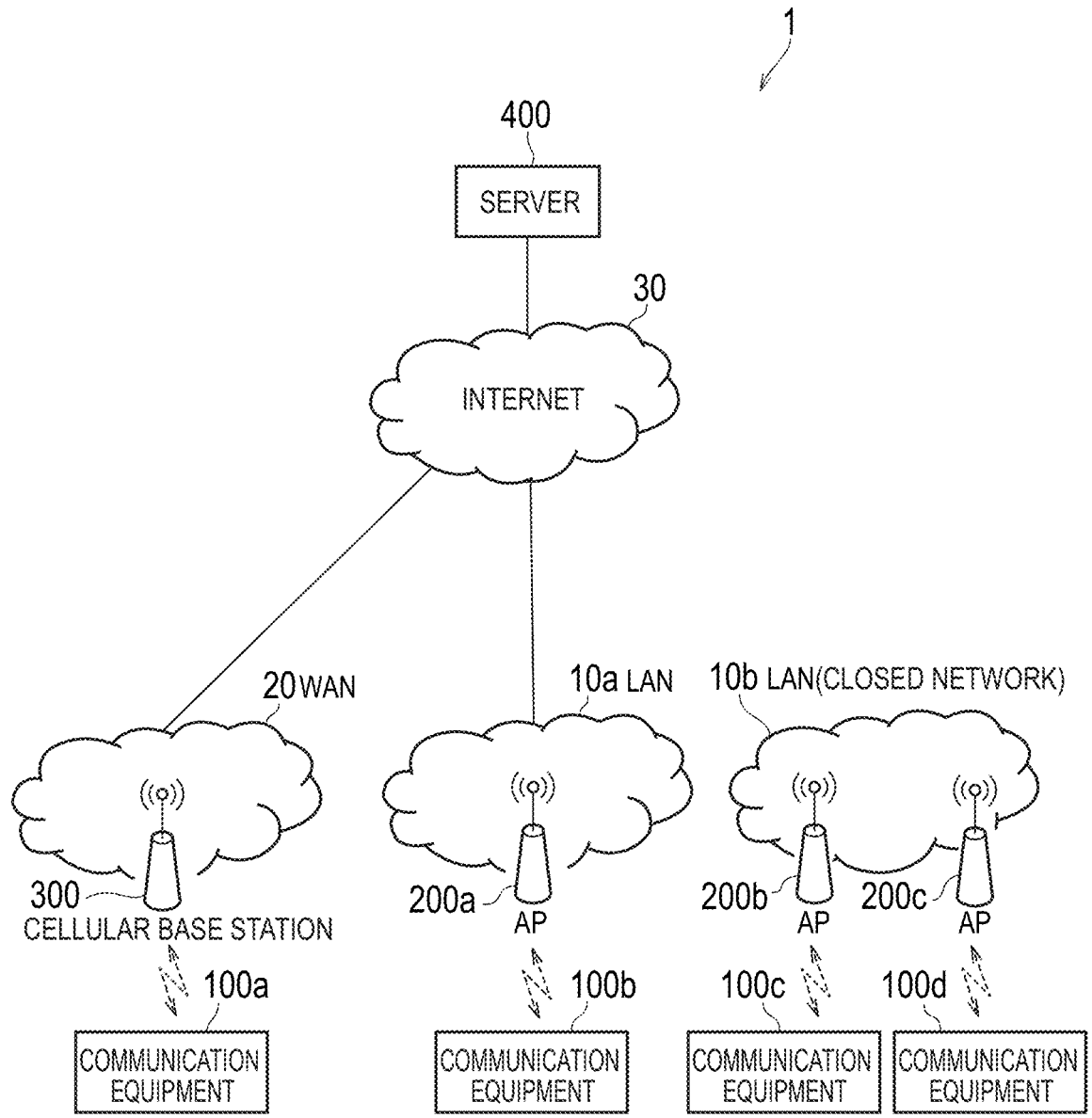
FIG. 1 is a diagram illustrating a configuration of a communication system according to a first embodiment.

In cases where a communication equipment executes a communication acknowledgement using a captive portal when performing connect process to an access point, the communication equipment is unable to complete the connect process to an access point that does not have a connection to the internet. Thus, there is a problem in that, unless a user manually disables the captive portal, a communication equipment is unable to connect to an access point that does not have an internet connection.

Therefore, the present invention enables a connection to an access point that does not have an internet connection without increasing the effort by the user.

An embodiment will now be described with reference to the drawings. In the description of the drawings hereinbelow, the same or similar reference numerals are assigned to the same or similar parts.

System Configuration Example

FIG. 1 is a diagram illustrating a configuration of a communication system 1 according to a first embodiment.

As illustrated in FIG. 1, the communication system 1 includes communication equipment 100a to 100c, access points (APs) 200a to 200c, Local Area Networks (LANs) 10a and 10b, a cellular base station 300, a Wide Area Network (WAN) 20, the internet 30, and a server 400.

Hereinbelow, the communication equipment 100a to 100c are referred to simply as "the communication equipment 100" when no particular distinction is to be made, the AP 200a to 200c are called simply the "AP 200" when no particular distinction is to be made, and the LAN 10a and 10b are called simply the "LAN 10" when no particular distinction is to be made.

The communication equipment 100 may be any device as long as the communication equipment 100 is a device that is compatible with at least wireless LAN communication, and is a smartphone, a tablet terminal, a personal computer (PC), or a wearable terminal, or the like, for example.

In the first embodiment, the communication equipment 100 is a device that is compatible with a dual communication system providing wireless LAN communication and cellular communication. The wireless LAN communication system is a system compliant with Institute of Electrical and Electronics Engineers (IEEE) standard 802.11, for example. The wireless LAN communication system is a system compliant with 3GPP (Third Generation Partnership Project) standards, for example.

The communication equipment 100a is connected wirelessly to the cellular base station 300 that belongs to the WAN 20. The WAN 20 has a connection to the internet 30. The communication equipment 100a accesses the internet 30 via the WAN 20.

The communication equipment 100b is connected wirelessly to the AP 200a that belongs to the LAN 10a. The LAN 10a has a connection to the internet 30. The communication equipment 100b accesses the internet 30 via the LAN 10a.

When performing connect process to the AP 200*a*, the communication equipment 100*b* performs a communication acknowledgement with respect to the server (an authentication server, for example) 400 on the internet 30 via the AP 200*a* and completes connect process to the AP 200*a* after confirming that an internet connection can be used. This function is sometimes called a captive portal.

The communication equipment 100*c* is connected wirelessly to the AP 200*b* that belongs to the LAN 10*b*. The communication equipment 100*d* is connected wirelessly to the AP 200*c* that belongs to the LAN 10*b*. The LAN 10*b* is a closed network that does not have a connection to the internet 30.

The communication equipment 100*c* and 100*d* are unable to access the internet 30 via the LAN 10*b*. However, the communication equipment 100*c* and 100*d* are able to perform an extension call via the LAN 10*b* by using wireless LAN communication.

The AP 200*b* and/or 200*c* may also be a device such as a printer that operates in AP mode. A device that operates in AP mode has an AP function. For example, the communication equipment 100*c* and 100*d* are capable of connecting to a printer that operates in AP mode and of issuing an instruction to the printer to perform an action such as printing.

In cases where the communication equipment 100*c* and 100*d* perform a communication acknowledgement using a captive portal when performing connect process to the AP 200*b* and 200*c*, the communication acknowledgement fails and the communication equipment 100*c* and 100*d* are unable to complete connect process to the AP 200*b* and 200*c*. Accordingly, unless a user manually disables the captive portal, the communication equipment 100*c* and 100*d* are unable to connect to the AP 200*b* and 200*c* that do not have an internet connection.

When performing connect process to the AP 200, the communication equipment 100 according to the first embodiment decides whether or not to perform a communication acknowledgement using a captive portal on the basis of identification information received from the AP 200.

More specifically, in a case where the communication equipment 100 decides to perform a communication acknowledgement, the communication equipment 100 performs the communication acknowledgement via the AP 200 and completes the connect process to the AP 200 in response to the communication acknowledgement succeeding. On the other hand, in a case where the communication equipment 100 decides to not perform a communication acknowledgement, the communication equipment 100 completes connection processing without performing a communication acknowledgement.

Thus, even without a user manually disabling the captive portal, the communication equipment 100 is capable of connecting to an AP 200 that does not have a connection to the internet 30.

(Example of Configuration of Communication Equipment)

Figures 2, 3:
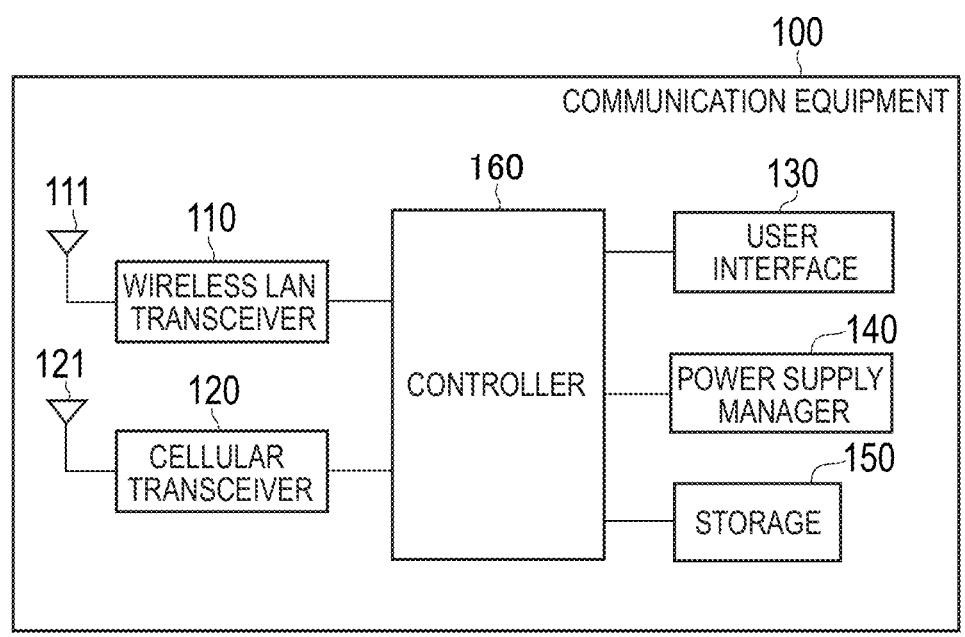
FIG. 2 is diagram illustrating a configuration of a communication equipment according to the first embodiment.
FIG. 3 is a diagram illustrating an internet-unreachable AP list according to the first embodiment.

FIG. 2 is a diagram illustrating a configuration of the communication equipment 100 according to the first embodiment.

As illustrated in FIG. 2, the communication equipment 100 includes a wireless LAN transceiver 110, a cellular transceiver 120, a user interface 130, a power supply manager 140, a storage 150, and a controller 160.

The wireless LAN transceiver 110 performs wireless LAN communication via an antenna 111. More specifically, the wireless LAN transceiver 110 performs amplification processing and filter processing, or the like, on a radio signal which the antenna 111 has received from the AP 200, and converts the radio signal to a baseband signal before outputting the signal to the controller 160. Furthermore, the wireless LAN transceiver 110 converts the baseband signal which has been output from the controller 160 to a radio signal and performs amplification processing, or the like, on the radio signal before transmitting the signal from the antenna 111.

The cellular transceiver 120 performs cellular communication via an antenna 121. More specifically, the cellular transceiver 120 performs amplification processing and filter processing, or the like, on a radio signal which the antenna 121 has received from the cellular base station 300 and converts the radio signal to a baseband signal before outputting the signal to the controller 160. Furthermore, the cellular transceiver 120 converts the baseband signal which has been output from the controller 160 to a radio signal and performs amplification processing, or the like, on the radio signal before transmitting the signal from the antenna 121.

The user interface 130 includes a display unit, an operating unit, a speech output unit, and a speech input unit, or the like, for example. The display unit displays an image on the basis of an image signal which is output from the controller 160. The operating unit receives user operations and outputs a signal corresponding to the operation content to the controller 160. The speech output unit outputs speech on the basis of a speech signal which is output from the controller 160. The speech input unit collects speech and outputs a speech signal to the controller 160.

The power supply manager 140 includes a battery and a peripheral circuit thereof. The power supply manager 140 supplies electrical power to drive the communication equipment 100. Note that, in a case where the communication equipment 100 receives a supply of power from the outside, the power supply manager 140 may also be configured from a circuit that converts the electrical power supplied from the outside.

The storage 150 includes a volatile memory and a non-volatile memory. The storage 150 stores a program which is executed by the controller 160 and information used in processing by the controller 160. In the first embodiment, the storage 150 stores a list (hereinafter called an "internet-unreachable AP list") of identification information of predetermined AP 200 which are incapable of using an internet connection.

For example, the controller 160 adds identification information of the predetermined AP 200 to the internet-unreachable AP list on the basis of an operation which the user interface 130 (operating unit) receives from a user. FIG. 3 is a diagram illustrating an internet-unreachable AP list according to the first embodiment. As illustrated in FIG. 3, the internet-unreachable AP list is a list in which identification information is recorded for each predetermined AP 200 which is incapable of using an internet connection.

Here, the identification information includes at least one of a Service Set Identifier (SSID), a Media Access Control (MAC) address, and an Internet Protocol (IP) address. The identification information may also include device type information of the device constituting the AP 200. The device type information denotes information indicating the type of the device operating in AP mode, and information indicating types, such as a printer type or a digital camera type, is equivalent to the device type information, for example.

The controller 160 performs various processing and control of the communication equipment 100. The controller 160 includes at least one processor. The processor may include a baseband processor and a Central Processing Unit (CPU). The baseband processor performs modulation/demodulation and coding/decoding of baseband signals, and the like. The CPU performs various processing by executing the program stored in the storage 150.

When performing connect process to the AP 200 using the wireless LAN transceiver 110, the controller 160 decides whether or not to perform a communication acknowledgement (that is, a communication acknowledgement using a captive portal) to confirm the availability of an internet connection via the AP 200, on the basis of the identification information which the wireless LAN transceiver 110 receives from the AP 200. Note that this kind of identification information is included in a beacon signal, which is a radio signal which the AP 200 broadcasts periodically.

The controller 160 determines that the AP 200 belongs to a closed network and decides to not perform a communication acknowledgement in cases where the identification information which the wireless LAN transceiver 110 receives from the AP 200 matches identification information contained in the internet-unreachable AP list stored in the storage 150. In a case where the controller 160 decides to perform a communication acknowledgement, the controller 160 performs the communication acknowledgement via the AP 200 and completes connection processing in response to the communication acknowledgement succeeding. On the other hand, in a case where the controller 160 decides to not perform a communication acknowledgement, the controller 160 completes connection processing without performing a communication acknowledgement.

(Example of Functioning of Communication Equipment)

FIG. 4 is a diagram illustrating the functioning of the communication equipment 100 according to the first embodiment.

As illustrated in FIG. 4, in step S1, the wireless LAN transceiver 110 of the communication equipment 100 receives a beacon signal from the AP 200. In FIG. 4, an example in which a beacon signal includes an SSID and device type information as the identification information of the AP 200.

In step S2, the controller 160 of the communication equipment 100 compares the identification information which the wireless LAN transceiver 110 receives from the AP 200 with the internet-unreachable AP list stored in the storage 150 and determines whether or not the AP 200 belongs to a closed network. Closed network refers to the LAN 10, which does not have a connection to the internet 30.

In step S3, the controller 160 of the communication equipment 100 controls the wireless LAN transceiver 110 to transmit a connection request to the AP 200.

In step S4, the wireless LAN transceiver 110 of the communication equipment 100 receives a connection response (Ack) from the AP 200. A radio connection between the communication equipment 100 and the AP 200 is established by means of steps S3 and S4.

In step S5, the controller 160 of the communication equipment 100 confirms whether or not the AP 200 belongs to the closed network on the basis of the determination result of step S2. In a case where the controller 160 has determined that the AP 200 does not belong to the closed network (step S5: No), the controller 160 decides to perform a communication acknowledgement and advances the processing to step S6. On the other hand, in a case where the controller 160 has determined that the AP 200 belongs to the closed network (step S5: Yes), the controller 160 decides to not perform a communication acknowledgement and advances the processing to step S9.

In step S6, the controller 160 of the communication equipment 100 controls the wireless LAN transceiver 110 to transmit a communication acknowledgement request to the server 400 via the AP 200.

In step S7, the wireless LAN transceiver 110 of the communication equipment 100 receives a communication acknowledgement response from the server 400 via the AP 200.

In a case where the communication acknowledgement response received in step S7 is an acknowledgement (Ack), the communication acknowledgement succeeds, and a network connection between the communication equipment 100 and the internet 30 is established. On the other hand, in a case where the communication acknowledgement response received in step S7 is a negative acknowledgement (Nack) or in a case where a timeout occurs without a communication acknowledgement response being received, the communication acknowledgement fails.

In a case where the communication acknowledgement has succeeded (step S8: Yes), in step S9 the controller 160 of the communication equipment 100 completes the connect process to the AP 200 and starts wireless LAN communication.

On the other hand, in a case where the communication acknowledgement has failed (step S8: No), in step S10 the controller 160 of the communication equipment 100 fails in the connect process to the AP 200. In this case, the controller 160 of the communication equipment 100 may control the cellular transceiver 120 to start cellular communication instead of starting wireless LAN communication.

Furthermore, in a case where, after the controller 160 of the communication equipment 100 has decided to perform a communication acknowledgement, the communication acknowledgement fails (step S8: No), the controller 160 may add the identification information which the wireless LAN transceiver 110 receives from the AP 200 to the internet-unreachable AP list. Thus, the controller 160 of the communication equipment 100 is capable of automatically expanding the internet-unreachable AP list and of completing the connection processing without performing a communication acknowledgement when connecting to the AP 200 on the next occasion.

Summary of Embodiment

When performing connect process to the AP 200, the communication equipment 100 according to the first embodiment decides whether or not to perform a communication acknowledgement using a captive portal on the basis of identification information received from the AP 200. Thus, even without a user manually disabling the captive portal, the communication equipment 100 is capable of connecting to an AP 200 that does not have a connection to the internet 30.

FURTHER EMBODIMENTS

A program that causes a computer to execute the respective processing executed by the communication equipment 100 may also be provided. Furthermore, the program may be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. In addition, a functional unit (circuit) that executes the respective processing performed by the communication equipment 100 may be integrated, and the communication equipment 100 may be configured as a semiconductor integrated circuit (chip set, SoC).

Although an embodiment has been described in detail hereinabove with reference to the drawings, the specific configuration is not limited to or by the foregoing embodiment, rather, various design modifications and the like can be made without departing from the spirit of the present invention.

The invention claimed is:

1. A communication equipment comprising:
a wireless LAN transceiver configured to perform a connect process to an access point, wherein the wireless LAN transceiver is further configured to receive identification information included in a beacon signal periodically broadcast by the access point before performing the connect process; and
a controller configured to perform, via the access point, a communication acknowledgement confirming availability of an internet connection, wherein in response to the wireless LAN transceiver performing the connect process, the controller is further configured to store an internet unreachable access point list comprising the identification information, wherein the identification information includes at least one of a Service Set Identifier (SSID), a Media Access Control (MAC) address, and an Internet Protocol (IP) address, the identification information further includes device type information indicating a type of device which operates as the access point, wherein
in response to receiving the identification information which corresponds to the identification information included in the internet unreachable access point list, the controller is configured to perform and complete the connection process without performing the communication acknowledgement confirming availability.

2. The communication equipment according to claim 1, wherein the controller is further configured to determine whether the access point belongs to a closed network based on the identification information in response to the wireless LAN transceiver performs the connect process.

3. The communication equipment according to claim 1, wherein the controller is further configured to perform the communication acknowledgement in response to the access point does not belong to the closed network.

4. The communication equipment according to claim 1, wherein the controller is further configured to receive the communication acknowledgement, and in response to the received communication acknowledgement being an acknowledgement, establish the internet connection.

5. The communication equipment according to claim 1, wherein the controller is further configured to receive the communication acknowledgement, and in response to the received communication acknowledgement being a negative acknowledge, not establish the internet connection.

6. The communication equipment according to claim 1, wherein the controller is further configured to not perform the communication acknowledgement in response to the access point belongs to the closed network.

7. A communication equipment comprising:
a wireless LAN transceiver configured to perform a connect process to an access point, wherein the wireless LAN transceiver is further configured to receive identification information included in a beacon signal periodically broadcast by the access point before performing the connect process; and
a controller configured to perform, via the access point, a communication acknowledgement confirming availability of an internet connection, wherein in response to the wireless LAN transceiver performing the connect process, the controller is further configured to:
determine whether the access point belongs to a closed network based on the identification information in response to the wireless LAN transceiver performing the connect process, and
store an internet unreachable access point list comprising the identification information, wherein the identification information includes at least one of a Service Set Identifier (SSID), a Media Access Control (MAC) address, and an Internet Protocol (IP) address, the identification information further includes device type information indicating a type of device which operates as the access point, wherein
in response to receiving the identification information which corresponds to the identification information included in the internet unreachable access point list, the controller is configured to perform and complete the connection process without performing the communication acknowledgement confirming availability.

8. The communication equipment according to claim 7, wherein the controller is further configured to perform the communication acknowledgement in response to the access point does not belong to the closed network.

9. The communication equipment according to claim 7, wherein the controller is further configured to receive the communication acknowledgement, and in response to the received communication acknowledgement being an acknowledgement, establish the internet connection.

10. The communication equipment according to claim 7, wherein the controller is further configured to receive the communication acknowledgement, and in response to the received communication acknowledgement being a negative acknowledgement, not establish the internet connection.

11. The communication equipment according to claim 7, wherein the controller is further configured to not perform the communication acknowledgement in response to the access point belongs to the closed network.

12. A communication equipment comprising:
A wireless LAN transceiver configured to perform a connect process to an access point, wherein the wireless LAN transceiver is further configured to receive identification information included in a beacon signal periodically broadcast by the access point before performing the connect process; and
a controller configured to perform, via the access point, a communication acknowledgement confirming availability of an internet connection, wherein in response to the wireless LAN transceiver performing the connect process, the controller is further configured to:
perform the communication acknowledgement in response to the access point does not belong to the closed network, and
store an internet unreachable access point list comprising the identification information, wherein the identification information includes at least one of a Service Set Identifier (SSID), a Media Access Control (MAC) address, and an Internet Protocol (IP) address, the identification information further includes device type information indicating a type of device which operates as the access point, wherein
in response to receiving the identification information which corresponds to the identification information included in the internet unreachable access point list, the controller is configured to perform and complete the connection process without performing the communication acknowledgement confirming availability.

13. The communication equipment according to claim 12, wherein the controller is further configured to determine whether the access point belongs to a closed network based on the identification information in response to the wireless LAN transceiver performing the connect process.

14. The communication equipment according to claim 12, wherein the controller is further configured to receive the communication acknowledgement, and in response to the received communication acknowledgement being an acknowledgement, establish the internet connection.

15. The communication equipment according to claim 12, wherein the controller is further configured to receive the communication acknowledgement, and in response to the received communication acknowledgement being a negative acknowledgement, not establish the internet connection.

16. The communication equipment according to claim 12, wherein the controller is further configured to not perform the communication acknowledgement in response to the access point belongs to the closed network.

* * * * *